United States Patent
Kerkau

[15] 3,679,172
[45] July 25, 1972

[54] VALVE ACTUATOR ASSEMBLY

[72] Inventor: La Vern H. Kerkau, 387 River Rd., Lagoon Beach, Bay City, Mich. 48706

[22] Filed: March 15, 1971

[21] Appl. No.: 124,021

[52] U.S. Cl.................................251/229, 74/89.15, 74/509
[51] Int. Cl..........................................................F16k 31/50
[58] Field of Search ..........................251/229, 266, 267, 270; 74/89.15, 509

[56] References Cited

UNITED STATES PATENTS 3,004,444  10/1961  Schmidlin et al. ................74/89.15 X
3,063,298  11/1962  Elliott...................................74/89.15

*Primary Examiner*—M. Cary Nelson
*Assistant Examiner*—David R. Matthews
*Attorney*—Learman & McCulloch

[57] ABSTRACT

For use with a valve having a hollow valve housing supporting a rotatable valve stem, a valve actuator including telescoping tubular members respectively connected to the valve stem and the valve housing and providing a substantially dirt-free enclosure, and cooperating screw and nut members received within said enclosure and reactable between said tubular members to relatively move said tubular members and turn said valve stem relative to the housing to selectively prevent and permit the flow of fluid through the valve housing.

10 Claims, 4 Drawing Figures

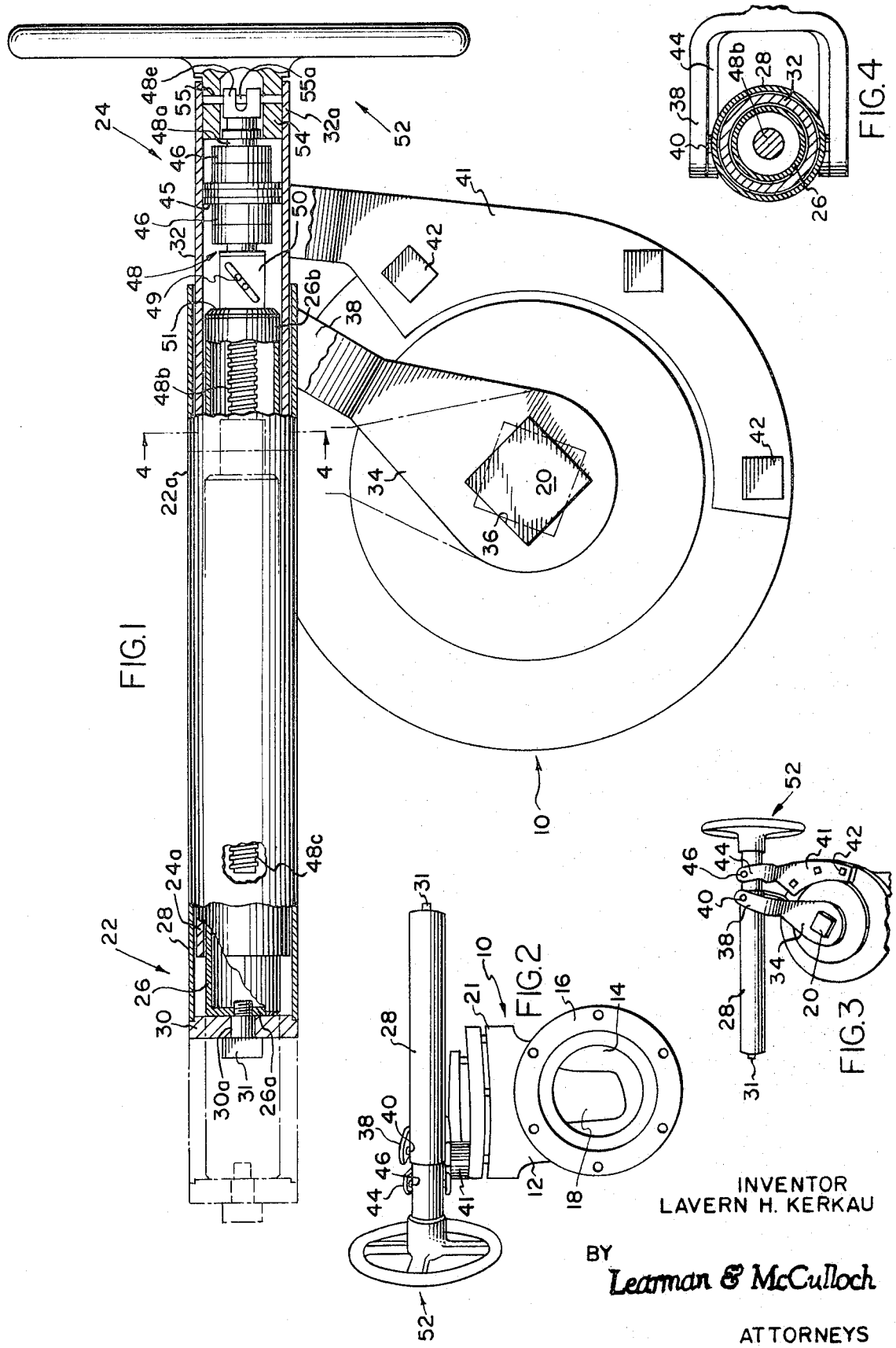

VALVE ACTUATOR ASSEMBLY

FIELD OF THE INVENTION

This invention relates to an operating mechanism for a fluid valve, and more particularly to a valve operator which provides a very high torque at a very low speed, and provides a substantially dirt-free enclosure for the operative elements thereof.

BACKGROUND OF THE INVENTION

In large fluid handling plants, such as chemical factories and the like, fluids are pumped from one processing unit to another through large pipes. To control the flow of fluid therethrough, valves, such as the 6-inch Plug Type Valve manufactured by Kerkau Manufacturing Company of Bay City, Michigan, as Part No. 656895-4, are conventionally utilized. To insure that fluid is not permitted to flow through the valve when the valve is closed, a valve of the type mentioned has a plug which must be turned slightly in excess of 90° between the fully open and fully closed position. These valves are ordinarily opened and closed by gripping the valve stem with the jaws of a large wrench and turning the wrench. When fluids of the type mentioned are pumped through a line at a high pressure, for example 100 p.s.i., approximately 400 foot lbs. of energy must be expended when the valve is turned between the open and closed positions with such a wrench. Valve actuators having a greater mechanical advantage than the wrench have been provided, but these actuators are limited in the environment in which they can be effectively utilized in that if the moving parts thereof are operated in an atmosphere having substantial amounts of dirt, foreign matter, or abrasive material, the dirt passes between and abrades the moving parts. Continued abrasion frequently results in an inoperative device.

SUMMARY OF THE INVENTION

Apparatus constructed according to the present invention provides a valve operator for turning a valve stem, which is mounted for rotary movement in a valve body, between angularly adjusted open and closed positions to selectively permit and prevent the flow of fluid through the valve body. The operator comprises a pair of axially movable, telescoping tubular sections, which are connected to the valve body and stem respectively, and which provide a substantially dirt-free enclosure. Movable means is provided within the enclosure and reacts between the tubular sections for axially moving the tubular sections relatively to each other to turn the stem between the open and closed positions. The placement of the movable reactable means within the tubular sections also minimizes the possibility of a person's clothing becoming entangled with the moving parts of the valve operator.

The present invention may more readily be understood by reference to the accompanying drawings, in which:

FIG. 1 is a partly sectional, top plan view of a valve operator constructed according to the present invention and mounted on a valve to be operated;

FIG. 2 is a rear elevational, perspective view of the apparatus illustrated in FIG. 1;

FIG. 3 is a front, perspective view of the apparatus illustrated in FIG. 1; and

FIG. 4 is a side, sectional view taken along the line 4—4 of FIG. 1.

DESCRIPTION OF THE PREFERRED EMBODIMENT

Apparatus constructed according to the present invention is particularly adapted for use with a valve assembly, generally designated 10, including a hollow valve housing or body 12 having an inlet port 14 therein adapted to be connected with a fluid inlet pipe (not shown) by means of a mounting flange 16 fixed to the housing 12. The valve housing 12 also includes a similarly constructed outlet port (not shown) adapted to be connected with a discharge conduit (not shown). The valve assembly 10 includes an apertured plug, valve, or gate 18 which is journaled for rotation in the body 12 between angularly displaced valve "open" and "closed" positions for selectively blocking and permitting communication of the inlet and outlet ports to prevent and permit the flow of fluid from the inlet port to the outlet port. A valve stem 20 is fixed to the upper side of the plug 18 and extends through and is journaled for rotation in the upper wall 21 of the housing 10.

Apparatus constructed according to the present invention is provided for turning the valve stem 20 about its axis so as to move the plug 18 between the open and closed positions and includes a pair of telescoping sections, generally designated 22 and 24 respectively. The section 22 includes inner and outer, generally coextensive, concentric tubes 26 and 28, each fixed at one end to a closure wall 30. The tube 28 is welded to the closure wall 30 whereas the tube 26 is fixed thereto by a threaded bolt 31 passing through an opening 30a in the wall 30 and threaded into an end wall 26a of the tubular member 26.

The tubular section 24 includes a third cylindrical tube 32 snugly received between the inner and outer tubes 26 and 28 and in sliding engagement with the outer and inner cylindrical surfaces of the tubes 26 and 28.

The outer tube 28 is connected to the valve stem 20 by a torque arm or yoke 34 having a squared opening 36 at one end thereof for receiving the squared stem 20. The yoke 34, at its opposite end, includes a clevis or stirrup 38 pivotally connected with the tube 28 by pins 40.

The tubular member 32 is connected to the valve body 12 by a yoke 41 fixed, at one end, to the body 12 by a plurality of bolts 42. The opposite end of the yoke 41 includes a clevis or stirrup 44 pivotally connected with the tube 32 by pivot pins 46.

Disposed axially inwardly of the end 32a of the tube 32 is a screw shaft supporting member 45 fixed to the internal surface of the tube 32 and mounting a pair of bearings 46 which support the unthreaded portion 48a of a screw shaft, generally designated 48, that includes a threaded portion 48b for receiving the balls 49 of a recirculating ball nut 50 in the usual manner. The recirculating ball nut 50 provides a closure wall 51 for the end 26b of the tube 26 and is operative to move the tube 26 axially relatively to the tube 32 when the screw 48 is rotated. A ball screw and nut actuator assembly of the type manufactured by the Saginaw Steering Gear Division of General Motors as Model No. 570–3555 is suitable for this purpose. The terminal end 48c of the threaded screw portion 48b is disposed within the tubular section 26. For turning the screw 48, a wheel, generally designated 52, is provided and includes a generally cylindrical shaft portion 54 journaled for rotation in the tube 32. A bore 55 is provided in the shaft portion 54 for receiving the end 48e of the shaft 48 which is fixed to the shaft portion 54 by a pin 55a.

THE OPERATION

With apparatus constructed according to the invention being mounted on a valve 10 as illustrated in FIGS. 1 – 3, the valve plug 18 and stem 20 are moved between the valve closing and valve opening positions by turning the wheel 52 to turn the screw 48 which will axially translate the ball nut 50 and tubular member 26 relatively to shaft 48 and the tubular member 32 since the tube 26 cannot rotate due to its being coupled to the tube 28 via the parts 31 and 30. In a typical 6 inch system under a head of 100 p.s.i, 400 foot lbs. of energy must normally be expended to turn the plug 18 between the open and closed positions. With apparatus constructed according to the present invention, only 4 – 6 foot lbs. of energy need be expended. When the tubular member 26 is translated axially relatively to the tubular member 32, the outer tubular member 28, connected to the tubular member 26 and in sliding engagement with the outer surface of the intermediate tubular member 32, is also translated axially. The walls 30 and wall 45 respectively close one end of each of the tubular sections 22 and 24 whereas the opposite ends 22a and 24a, respectively, are in opposed telescoping relation to provide a closure therefor. Because of the closed construction, the screw 48 and nut 50 are protected from dirt and foreign matter which may exist in the environment of the valve. Because the screw 45 and nut 50 are protected from the environmental dirt, the life of these moving parts is substantially extended.

The valve operator may also be mounted on the valve body and valve stem in an inverted position. This reversibility feature is important when space limitations restrict movement of either the wheel 52 or the tubular section 22. In the inverted position, the wheel 52 is turned in the opposite direction to move the valve stem 20.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. For use with a valve having a hollow valve body, plug means journaled by said valve body for rotation between angularly displaced positions to permit or prevent fluid flow through said valve body, and a valve stem connected to said plug means for rotation therewith and including a torque arm extending generally radially of the axis of rotation of said stem; an actuator reactable between said valve body and said stem to rotate said stem about its axis comprising:

first and second longitudinal sections in telescoping engagement and pivotally connected to said torque arm and said valve body respectively;
rotary screw means connected to one of said sections; and
means connected to the other of said sections for threadedly receiving said screw means to relatively move said sections longitudinally when said screw means is rotated to turn said valve stem about its axis and move said plug means between said angularly displaced positions.

2. The apparatus as set forth in claim 1 wherein said first and second sections comprise tubular telescoping members providing a substantially dirt-free enclosure for said screw means and screw receiving means.

3. The apparatus set forth in claim 1 wherein each of said sections is tubular and closed at one end and open at the other end; the open ends of said tubular sections being in opposed telescoping relation; said screw means and screw receiving means being received within said tubular sections.

4. The apparatus set forth in claim 1 wherein said first section comprises a longitudinal tubular member and said second section comprises inner and outer longitudinal, tubular members coaxial with said first mentioned tubular member, said inner and outer tubular members being slidingly engageable with the inner and outer surfaces of said first mentioned tubular member, and means closing the ends of said inner and outer tubular members remote from the telescopically received ends of said first mentioned tubular member to provide a substantially dirt-free enclosure for said screw means and screw receiving means.

5. For use with a valve having a valve body and a rotary valve stem supported by said valve body for rotary movement between valve opening and valve closing positions to respectively permit and prevent the flow of fluid through said valve body, an actuator comprising:

inner and outer coaxial, longitudinal, tubular members connected to each other for simultaneous movement and adapted to be coupled to one of said valve stem and said valve body;
an additional longitudinal tubular member telescopically received between and in sliding engagement with said inner and outer tubular members and adapted to be coupled to the other of said valve stem and said valve body; and
means received within and reactable between said inner and outer tubular members and said additional tubular member to longitudinally relatively move said inner and outer tubular members and said additional tubular member so as to turn said valve stem between said valve opening and valve closing positions.

6. The apparatus set forth in claim 5 including a closure wall connected to said inner and outer tubular members for closing one end, remote from the telescopically received end, of each of said inner and outer tubular members to prevent dirt from entering said tubular members.

7. Apparatus as set forth in claim 6 including means for closing one end, remote from the telescopically received end, of said additional tubular member.

8. Apparatus as set forth in claim 7 wherein said reactable means includes rotary screw means connected to said additional tubular member, and nut means connected to said inner tubular means and cooperating with said screw means to axially move said tubular members when said screw means is rotated.

9. Apparatus as set forth in claim 8 including means received within said additional tubular means for rotating said screw means.

10. Actuator apparatus for a rotary valve or the like, said apparatus comprising:

concentric inner and outer tubular members;
an intermediate tubular member slidably interposed between said inner and outer members for telescoping movement relative thereto and projecting beyond corresponding ends of said inner and outer members; and
actuating means carried by said intermediate member and acting on one of said inner and outer members to effect telescoping movement of said intermediate member relative to said one of said members; and means coupling said inner and outer members to one another for conjoint movement.

* * * * *